United States Patent [19]

Tadokoro et al.

[11] Patent Number: 4,730,456

[45] Date of Patent: * Mar. 15, 1988

[54] TURBO-SUPERCHARGER FOR AN INTERNAL COMBUSTION ENGINE

[75] Inventors: Tomoo Tadokoro; Ikuo Matsuda, both of Hiroshima, Japan

[73] Assignee: Mazda Motor Corporation, Hiroshima, Japan

[*] Notice: The portion of the term of this patent subsequent to Oct. 21, 2003 has been disclaimed.

[21] Appl. No.: 841,227

[22] Filed: Mar. 19, 1986

Related U.S. Application Data

[63] Continuation-in-part of Ser. No. 681,829, Dec. 14, 1984, Pat. No. 4,617,799.

[30] Foreign Application Priority Data

Dec. 16, 1983 [JP] Japan ............... 58-238398
Mar. 19, 1985 [JP] Japan ............... 60-56341

[51] Int. Cl.⁴ .................................... F02B 37/12
[52] U.S. Cl. .................... 60/602; 251/298; 415/151
[58] Field of Search .......... 60/600, 601, 602, 603; 137/330; 251/298, 281, 56, 84; 415/151

[56] References Cited

U.S. PATENT DOCUMENTS

| | | | |
|---|---|---|---|
| 236,342 | 1/1881 | Leng | 251/298 X |
| 2,816,729 | 12/1957 | Jensen | 251/298 X |
| 3,557,549 | 1/1971 | Webster | 60/13 |
| 4,008,572 | 2/1977 | Woollenweber, Jr. | 60/602 |
| 4,120,156 | 10/1978 | McInerney | |
| 4,389,845 | 6/1983 | Koike | 60/602 |
| 4,395,884 | 8/1983 | Price | |
| 4,443,153 | 4/1984 | Dibelius | 415/151 |
| 4,463,564 | 8/1984 | McInerney | 60/602 |
| 4,512,714 | 4/1985 | Kaesser | 415/151 |
| 4,617,799 | 11/1986 | Todokoro et al. | 60/602 |

FOREIGN PATENT DOCUMENTS

| | | |
|---|---|---|
| 180917 | 5/1986 | European Pat. Off. . |
| 1253510 | 11/1967 | Fed. Rep. of Germany . |
| 2558878 | 7/1977 | Fed. Rep. of Germany . |
| 2824401 | 12/1978 | Fed. Rep. of Germany . |
| 3008180 | 9/1981 | Fed. Rep. of Germany . |
| 50-8306 | 1/1975 | Japan . |
| 56-113015 | 9/1981 | Japan . |
| 58-18522 | 2/1983 | Japan . |
| 18522 | 2/1983 | Japan . |
| 58-79622 | 5/1983 | Japan . |
| 58-172427 | 10/1983 | Japan . |
| 128931 | 7/1985 | Japan . |
| 0182317 | 9/1985 | Japan ............ 60/602 |
| 0830065 | 5/1981 | U.S.S.R. ............ 251/298 |

Primary Examiner—Michael Koczo
Attorney, Agent, or Firm—Fleit, Jacobson, Cohn & Price

[57] ABSTRACT

A turbo-supercharger for an engine including a turbine casing of which scroll is formed with two exhaust gas inlet passages. The turbine casing has an inlet end surface connected with the outlet end surface of an engine exhaust pipe. The inlet passages are opened to the inlet end surface of the turbine casing respectively through inlet ports which are arranged in side-by-side relationship. A valve mechanism is provided to close one of the inlet ports under a low speed engine operation. The valve mechanism has a valve member adapted to seat on the inlet end surface and a swingable arm mounted on the exhaust pipe for moving the valve member. The exhaust pipe is formed with a sidewardly bulged portion where the swingable arm is supported. The swingable arm and the valve member are substantially received in the bulged portion in the open position.

12 Claims, 9 Drawing Figures

TURBO-SUPERCHARGER FOR AN INTERNAL COMBUSTION ENGINE

CROSS REFERENCE TO THE RELATED APPLICATION

This application is a continuation-in-part of the application Ser. No. 681,829 filed on Dec. 14, 1984 now U.S. Pat. No. 4,617,799.

BACKGROUND OF THE INVENTION

1. Field of the Invention

The present invention relates to a turbo-supercharger for an internal combustion engine, and more particularly to a turbo-supercharger having an exhaust turbine provided with a plurality of exhaust gas inlet passages and valve means for closing one or more of the exhaust gas inlet passages so that the effective exhaust gas inlet passage area can be changed in accordance with the engine operating conditions.

2. Description of the Prior Art

Conventional turbo-superchargers for internal combustion engines include on exhaust gas turbine having a turbine casing provided with a single exhaust gas inlet passage leading to a turbine chamber where the turbine rotor is located. Since the turbine efficiency is governed by an A/R ratio wherein A is the area of the exhaust gas passage in the turbine casing and R is the radius of the turbine casing scroll, the conventional design has been such that the A/R ratio is determined so that the highest turbine efficiency can be accomplished under a medium speed engine operation. It has been considered that, with this design, a relatively high efficiency can be obtained throughout the engine operating range.

It should however be noted that, under the conventional design wherein the A/R ratio is determined so that the best result is obtained in the medium speed engine operating range, the quantity of the exhaust gas is beyond an optimum value under a high speed range so that there will be an increase in the flow resistance and a consequent increase in the back pressure at the engine exhaust ports. The increase in the flow resistance disturbs an effective utilization of the energy in the exhaust gas so that the turbine efficiency is decreased. The increase in the back pressure causes a poor combustion efficiency so that a sufficient engine output cannot be obtained.

Further, under a low speed engine operation, the quantity of the exhaust gas is lower than an optimum value so that the exhaust gas flow is decreased. As the result, the exhaust gas cannot drive the turbine rotor with a sufficiently high speed so that the turbine efficiency is undesirably decreased.

In order to overcome the disadvantages of the conventional turbo-supercharger, it has been proposed to separate the exhaust gas inlet passage in the turbine casing into a plurality of passage sections and close one or more of the passage sections under a low speed engine operation by means of an appropriately provided valve mechanism. For example, in the Japanese patent application No. 56-116426 filed on July 27, 1981 and published for public inspection on Feb. 3, 1983 under the disclosure number 58-18522, there is disclosed a turbo-supercharger including a turbine casing in which the turbine scroll defining the exhaust gas inlet passage is formed with a radial partition wall which divides the exhaust gas inlet passage into two parallel inlet passage sections. The first one of the inlet passage sections is opened at the inlet end of the turbine casing so as to be connected with the exhaust passage of the engine. The second inlet passage section has an inlet end connected with the first passage section through a communication port formed in the partition wall to open to an intermediate portion of the first passage section. The turbine casing carries a valve which closes the communication port under a low speed engine operation so that the exhaust gas is passed only through the first passage section to the turbine chamber where the turbine rotor is located.

The proposed turbo-supercharger is considered as being advantageous in that the effective area of the exhaust gas inlet passage can be changed in accordance with the engine speed so that a turbine efficiency can be obtained under a wide engine speed range. It should however be noted that the proposed arrangement has disadvantages due to the fact that the communication port is formed in the partition wall separating the two passage sections. One of such disadvantages is that, under a high speed operating range, a part of the exhaust gas flows into the second passage section from the inlet part of the one passage section through the communication port abruptly changing its direction of flow so that the flow resistance is increased under a high speed range. Further, under a high speed engine operating range, the exhaust gas flow through the communication port has a tendency of flowing in a direction inclined with respect to the axis of the communication port so that the effective area of the port is decreased and the flow resistance is increased. The problem may be solved by increasing the diameter of the communication port. However, this solution causes an increase in the dimensions of the valve mechanism.

Further disadvantages are derived in the proposed arrangement due to the fact that the valve mechanism is provided on the turbine casing. At first, it should be pointed out that complicated thermal deformations are produced in the turbine casing so that it is difficult to maintain a satisfactory seal between the valve member and the valve seat which is formed in the turbine casing. It is further difficult to provide a space for locating the valve mechanism in the turbine casing.

In the copending patent application Ser. No. 681,829 filed on Dec. 14, 1984, now U.S. Pat. No. 4,617,799, and assigned to the same assignee of the present invention, there is disclosed a turbo-supercharger having a turbine casing which is formed with a substantially planar inlet end surface where two mutually separated exhaust gas inlet passages are opened. This application further teaches to use the inlet end surfaces as the valve seat for the valve mechanism and to carry the valve member not on the turbine casing but on the engine exhaust pipe. The application does not however teach in detail how the valve member should be located in its open position.

SUMMARY OF THE INVENTION

It is therefore an object of the present invention to provide a turbo-supercharger having a turbine casing provided with a plurality of mutually separated exhaust gas inlet passages and a valve mechanism for controlling the inlet passages in accordance with the engine operating conditions.

A further object of the present invention is to minimize the flow resistance not only of the passages in the exhaust gas turbine but also of the valve mechanism in a turbo-supercharger of the aforementioned type to thereby improve the supercharging efficiency.

Still further object of the present invention is to make the turbine casing compact without increasing the flow resistance.

Yet further object of the present invention is to make thermal deformations of the turbine casing as small as possible by making it possible to provide a simplified structure.

According to the present invention, the above and other objects can be accomplished by a turbo-supercharger for an engine, comprising a supercharger compressor located in an intake system of the engine and an exhaust gas turbine located in an exhaust system of the engine for driving the compressor, said turbine including a turbine casing and a turbine rotor rotatably supported in said turbine casing, said exhaust system of the engine having exhaust pipe means defining an exhaust passage and connected with said turbine casing, said turbine casing having exhaust gas inlet passage means for directing exhaust gas of the engine from the exhaust passage to said turbine rotor, said inlet passage means including at least a first inlet passage and a second inlet passage which are located in a side-by-side relationship with each other, valve means for closing said second inlet passage, characterized by the fact that said first and second inlet passages are opened to said exhaust passage in said exhaust pipe means respectively through first and second inlet ports which are oriented in a direction opposing to exhaust gas flow in the exhaust passage, said exhaust pipe means being formed in portion adjacent to said turbine casing with a sidewardly bulged portion, said valve means including a valve member adapted for closing said second inlet port and swingable arm means for supporting said valve member swingable on said exhaust pipe means so that said valve member is located substantially in said bulged portion in an open position of the valve member.

According to the features of the present invention, the first and second inlet ports are oriented in a direction opposing the exhaust gas flow in the exhaust passage so that the exhaust gas flow can be drawn into both the first and second inlet passages without changing the direction of the flow. It is therefore possible to decrease the flow resistance. Since the valve means is mounted on the exhaust pipe means, the turbine casing can be of a simple configuration so that complicated thermal deformations are avoided. By mounting the valve member so that it is located in the open position substantially in the bulged portion of the exhaust pipe means, the exhaust gas flow is not disturbed by the valve member in the open position.

The invention will now be described with reference to a specific embodiment taking reference to the accompanying drawings.

DESCRIPTION OF THE PREFERRED EMBODIMENT

Figure 1:
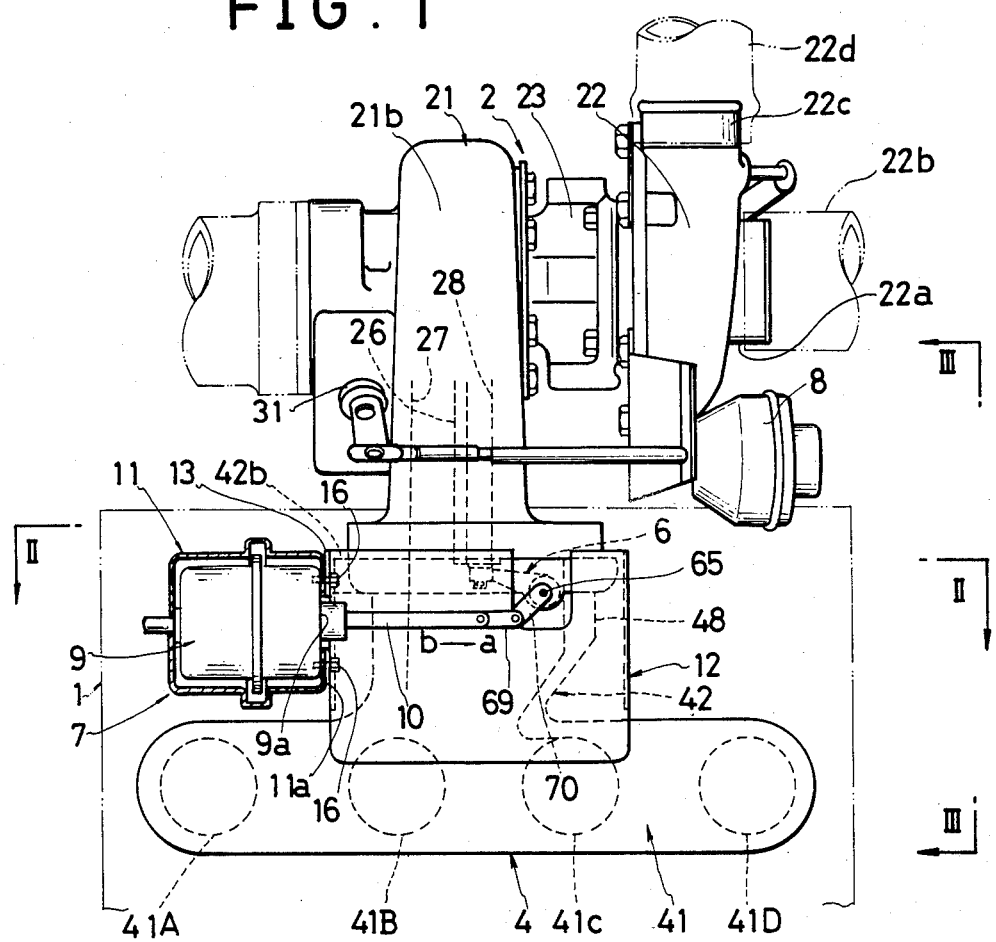
FIG. 1 is a front view of a turbo-supercharger in accordance with one embodiment of the present invention.
Figure 2:
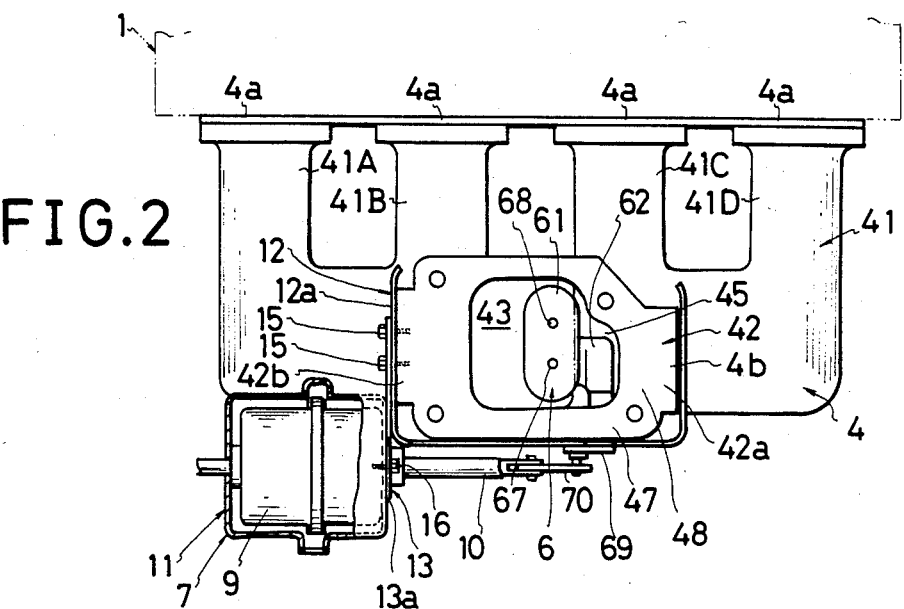
FIG. 2 is a sectional view taken substantially along the line II—II the FIG. 1.
Figure 3:
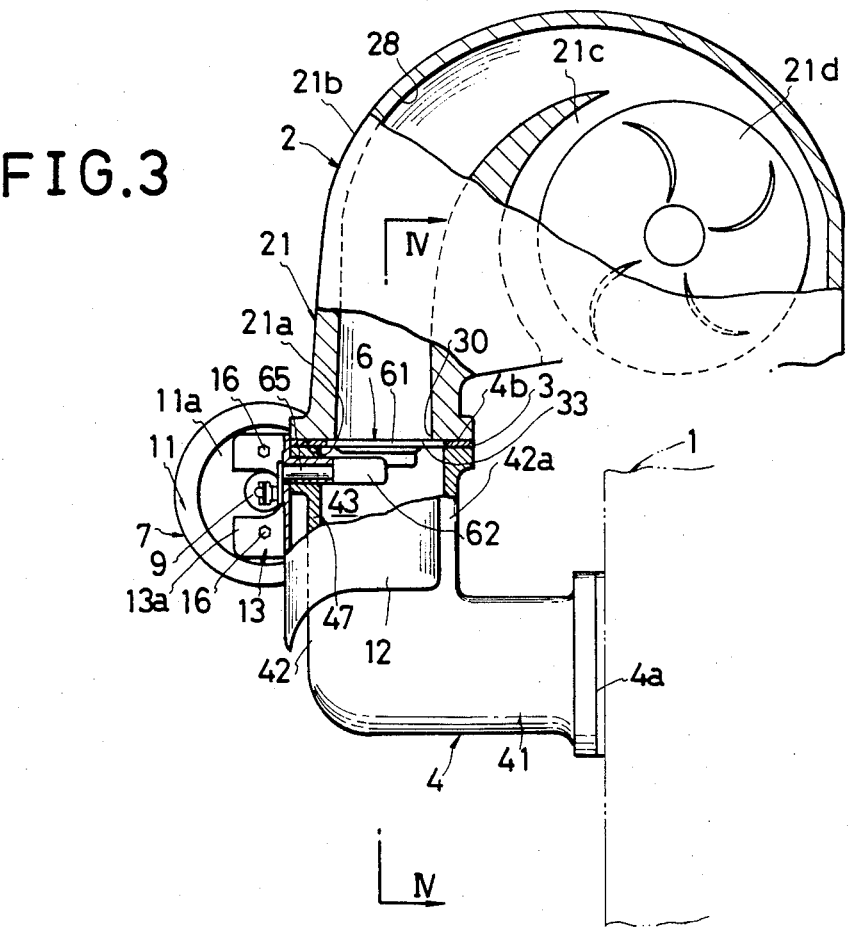
FIG. 3 is a side view as seen in the direction of the arrow III—III in FIG. 1.

Referring now to the drawings, particularly to FIGS. 1 through 3, there is shown an engine 1 having an exhaust pipe 4 and a turbo-surpercharger 2 attached to the turbo-supercharger 2 through a gasket 3. As shown in FIG. 1, the turbo-supercharger 2 includes a turbine casing 21 and a compressor casing 22 which are connected together by a center casing 23. The compressor casing 22 has an inlet 22a connected with an upstream intake pipe element 22b and an outlet 22c connected with a downstream intake pipe element 22d. The intake pipe elements 22b and 22d together form an intake system for the engine 1. Although not shown in the drawings, a compressor rotor is disposed in the compressor casing 22.

Referring to FIG. 2, it will be noted that the exhaust pipe 4 includes a branch pipe section 41 having branch pipe portions 41A, 41B, 41C and 41D which have inlet end surfaces 4a connected with inlet ports of individual cylinders of the engine 1. The branch pipe portions 41A, 41B, 41C and 41D are connected with a manifold section 42 having an outlet pipe portion 42a. The outlet pipe portion 42a terminates at a planar outlet end surface 4b. The turbine casing 21 has a planar inlet and surface 21a which is attached to the exhaust pipe 4 at the outlet end surface 4b of the outlet pipe portion 42a as shown in FIG. 3. The turbine casing 21 has a scroll section 21b in which a rotor chamber 21c is defined. In the rotor chamber 21c, there is a turbine rotor 21d which is connected with the compressor rotor in the compressor casing 22.

Figure 4:
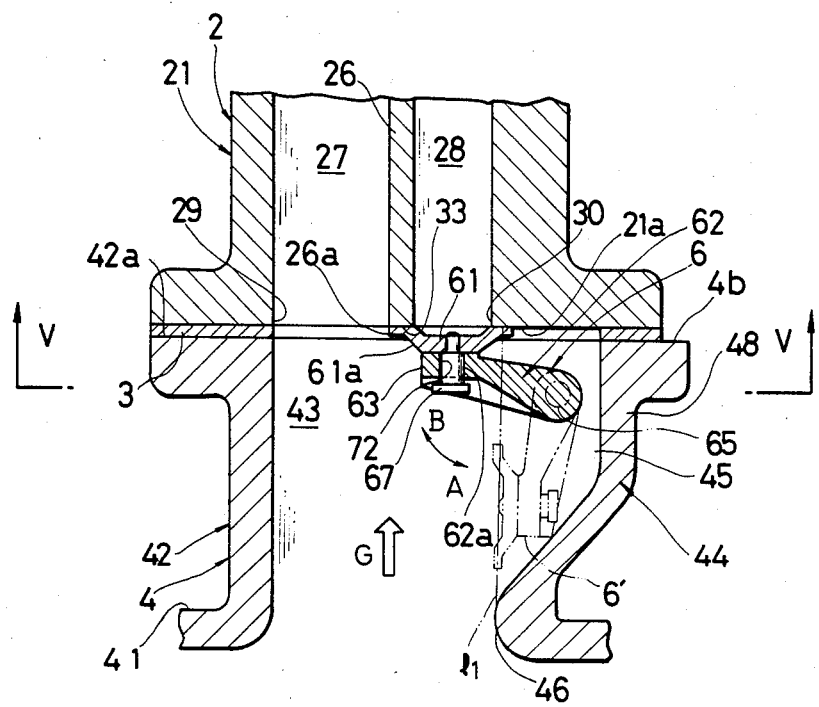
FIG. 4 is a sectional view taken along the line IV—IV in FIG. 3.
Figure 5:
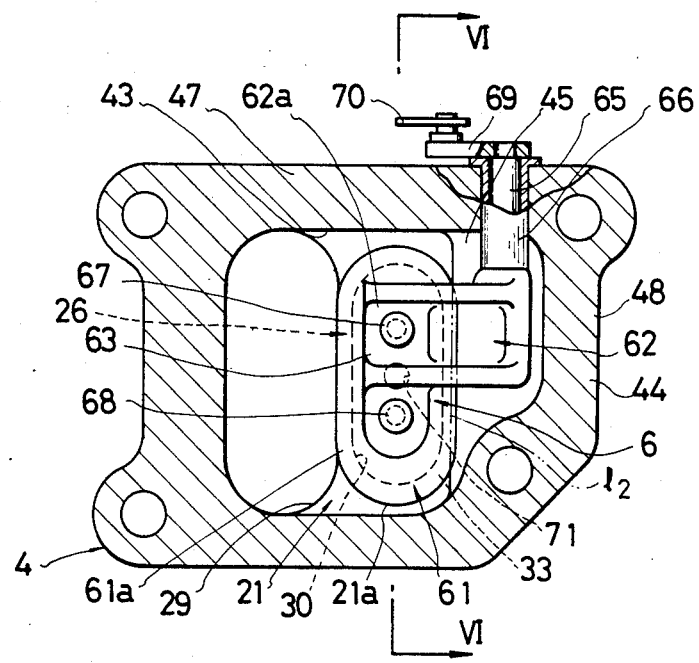
FIG. 5 is a sectional view taken along the line V—V in FIG. 4.

In order to lead the engine exhaust gas from the exhaust pipe 4 to the turbine chamber 21c in the turbine casing 21, the turbine casing 21 is formed with a first exhaust gas inlet passage 27 and a second exhaust gas inlet passage 28 which are located in a side-by-side relationship as shown in FIG. 4 with a partition wall 26 located therebetween. As shown in FIGS. 4 and 5, the inlet passages 27 and 28 open to the inlet end surface 21a of the turbine casing 21 respectively through inlet ports 29 and 30. It will be noted in FIG. 4 that the inlet ports 29 and 30 are oriented in a direction opposing to the exhaust gas flow G from the outlet pipe portion 42 of the exhaust pipe 4. It will further be noted in FIG. 5 that the inlet ports 29 and 30 are oblong in cross-section, and may be of elliptical configurations each having a minor axis and a major axis and aligned with each other in the direction of the minor axis. As shown, the port 29 is larger than the port 30.

A valve mechanism 6 is provided for closing the inlet port 30. Referring to FIGS. 4 through 7, it will be noted that the valve mechanism 6 includes a valve member 61 which is adapted to seat on valve seat 33 defined around the periphery of the inlet port 30 on the inlet end surface 21a of the turbine casing 21. The outlet pipe portion 42 of the exhaust pipe 4 has an exhaust gas outlet passage 43 which has an area sufficient to cover the inlet ports 29 and 30 of the exhaust gas inlet passages 27 and 28, respectively. The outlet pipe portion 42 is further formed at a side adjacent to the inlet port 28 with a sidewardly bulged portion 44 which defines a valve receiving space 45. The outlet pipe portion 42 has a side wall 47 which is located at a far side from the engine 1 and provided with a bearing sleeve 66 extending through the wall 47 into the space 45.

Figure 6:
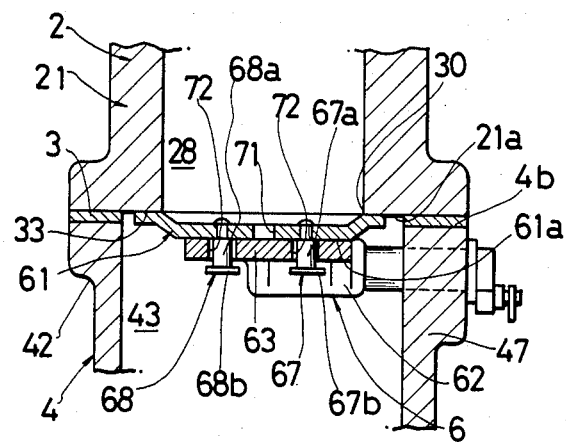
FIG. 6 is a sectional view taken along the line VI—VI in FIG. 5.
Figure 7:
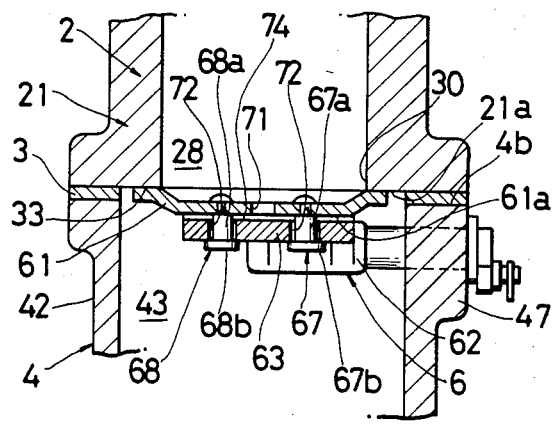
FIG. 7 is a sectional view similar to FIG. 6 but showing an operation of the valve mechanism.

The bearing sleeve 66 rotatably supports a shaft 65 which is integral with a valve actuating arm 62 located in the space 45. The arm 62 has a free end 62a formed with a valve depressing plate 63 to which the valve member 61 is connected by means of a pair of connecting pins 67 and 68 inserted into pin holes 72 in the plate 63. As shown in FIGS. 6 and 7, the pins 67 and 68 respectively have shanks 67a and 68a and heads 67b and 68b. The shanks 67a and 67b are inserted into the pin holes 72 with clearances in radial and axial directions so that the valve member 61 is connected with the valve depressing plate 63 with a play. Therefore, the valve member 61 can move with respect to the plate 63 in the direction of the axes of the pins 67 and 68 and in the direction parallel to the plate 63. It will be noted in FIGS. 5 through 7, the valve member 61 is formed at the center thereof with a vent hole 71. When the arm 62 is actuated to force the valve member 61 against the valve seat 33, the vent hole 71 is closed by the valve depressing plate 63 so that the valve member 61 completely closes the inlet port 30 as shown in FIG. 6. At this position, the ram pressure of the exhaust gas flow in the passage 43 is applied to the outer surface 61a of the valve member 61 and functions to maintain the valve member 61 in the closed position. When it is desired to open the valve, the arm 62 is actuated so that the valve depressing plate 63 is moved away from the valve seat 33. At an initial period of the movement of the arm 62, the plate 63 is moved apart from the valve member 61 as shown in FIG. 7 since the valve member 61 is forced toward the valve seat 33 under the pressure of the exhaust gas. The movement of the plate 63 produces a clearance 74 between the valve member 61 and the plate 63 so that the vent hole 71 is opened to relieve the exhaust gas pressure. This is effective to weaken the pressure difference across the valve member 61 so that the valve member 61 can readily be detached from the valve seat 33. It should further be noted that, in the position shown in FIG. 7, the pin holes 72 are closed by the heads 67b and 68b of the pins 67 and 68 so that the exhaust gas is prevented from flowing through the holes 72. This arrangement is effective to prevent deterioration of the walls of the pin holes 72 under the heat of the exhaust gas.

As shown in FIGS. 4 and 5, the valve member 61 totally covers the end surface of the partition wall 26 in the closed position. This arrangement is effective to suppress influences of heat on the partition wall 26. By covering the end surface of the partition wall 26 with the valve member 61, it is possible to prevent the end surface of the partition wall 26 from being directly exposed to the heat of the exhaust gas so that the temperature increase in partition wall 26 can by suppressed. It is therefore possible to avoid or at least decrease occurence of cracks due to thermal stresses.

It is preferable to make the configuration of the inlet port 30 and also the configuration of the valve member 61 oblong or elliptical because such configuration makes it possible to decrease the length of the valve actuating arm 62 by arranging the axis of the swinging movement of the arm 62 in parallel with the major axis of the oblong shape or ellipse. It is therefore possible to decrease the torque required for actuating the valve member 61. In case where the valve member 61 is of an oblong configuration as in the illustrated embodiment, it is also preferable to connect the valve member 61 to the valve actuating arm 62 by means of a pair of pins as shown so that the orientation of the valve member 61 can be maintained.

The floating connection between the valve member 61 and the valve depressing plate 63 on the valve actuating arm 62 provides a further advantage. It will be possible that the valve seat 33 be deformed or worn through a prolonged use, or carbon deposits may be formed on the valve seat 33. These phenomenons will apparently disturb a proper seating of the valve member 61 on the valve seat 33. However, according to the floating connection, the valve member 61 can follow such irregularities on the valve seat 33 to a certain degree, so that it is possible to prevent the valve member 61 from being lifted as a whole from the valve seat 33.

Figure 8:
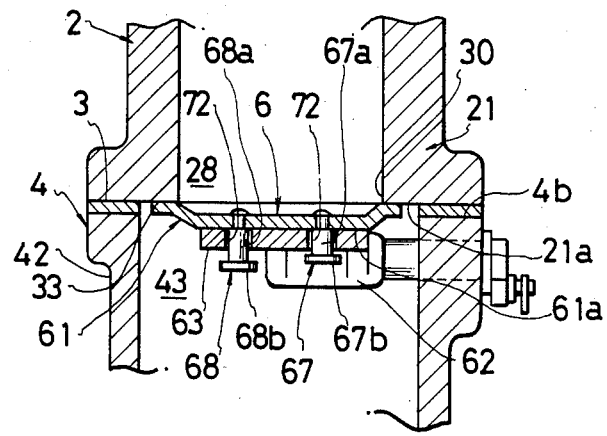
FIG. 8 is a sectional view showing a modified type of the valve mechanism.
Figure 9:
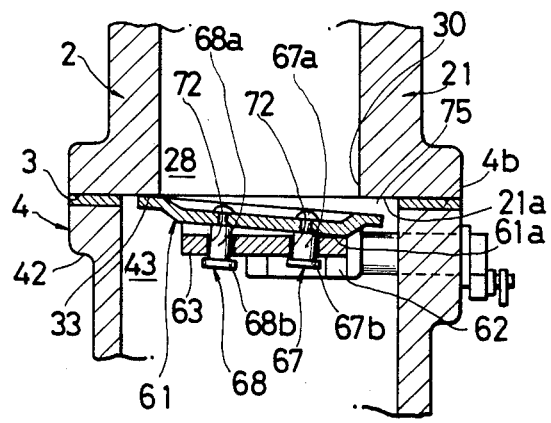
FIG. 9 is a sectional view showing an operation of the valve mechanism shown in FIG. 8.

FIGS. 8 and 9 show a modification of the valve mechanism. In this arrangement, the pins 67 and 68 connecting the valve member 61 to the valve depressing plate 63 on the valve actuating arm 62 have different lengths. More specifically, the pin 67 is shorter than the pin 68. The valve member 61 has no vent hole. In this arrangement, when the valve is to be opened, the plate 63 is engaged at first with the head 67b of the pin 67 so that the valve member 61 is lifted at first at the side adjacent to the pin 67 as shown in FIG. 9.

Referring back to FIGS. 4 and 5, the valve actuating shaft 65 extends into the space 45 defined by the bulged portion 44 in the outlet portion 42 of the exhaust pipe 4. The valve actuating arm 62 integral with or secured to the shaft 65 is substantially located in the space 45. In the closed position, the valve member 61 and the free end portion of the arm 62 are placed in the exhaust passage 43 as shown by solid lines in FIG. 4. However, in the open position, the valve actuating arm 62 is completely received in the space 45 defined by the bulged portion 44. Further, the valve member 61 is substantially located in the space 45 as shown by phantom lines although a part of the valve member 61 is projected into the passage 43. This arrangement provides an advantage in that the valve mechanism does not produce a resistance against the exhaust gas flow G in the passage 43 in the open position of the valve mechanism. Further, since the valve mechanism is carried by the exhaust pipe 4, it is possible to make the structure of the turbine casing 21 simple as compared with the structure wherein the valve mechansim is provided in the turbine casing 21.

In order to actuate the valve mechanism, there is provided a valve actuating device 7 including a pneumatic actuator 9 which may be of a diaphragm type. The actuator 9 is supplied with an air or other gas pressure which is dependent on the engine operating condition. The actuator 9 is mounted on the outlet pipe portion 42 of the exhaust pipe 4 at a side opposite to the engine 1 as shown in FIGS. 2 and 3. For the purpose, a heat insulator 12 is attached at a side portion 12a to the outlet pipe portion 42 by means of bolts 15. A bracket plate 13 is also attached to the insulator 12 by the aforementioned bolts 15. The bracket plate 13 has an end portion 13a projecting from the insulator 12 and a heat insulator 11 enclosing the actuator 9 is attached by means of bolts 16 to the end portion 13a of the bracket plate 13.

The actuator 9 has an actuating rod 10 which is connected with one end of a link 70. The other end of the link 70 is connected to an arm 69 which is secured to the valve actuating shaft 65. It will therefore be understood that the arm 62 and the valve member 61 are moved by the actuator 9 between the open and closed positions as shown by arrows A and B in FIG. 4 in accordance with the engine operating conditions. For example, the actuator 9 may be operated so that the valve is closed under a low speed engine operation and opened under a high speed engine operation.

The invention has thus been shown and described with reference to a specific embodiment, however, it should be noted that the invention is in no way limited to the details of the illustrated structures but changes and modifications may be made without departing from the scope of the appended claims.

What is claimed:

1. A turbo-supercharged for an engine, comprising a supercharging compressor located in an intake system of the engine and an exhaust gas turbine located in an exhaust system of the engine for driving the compressor, said turbine including a turbine casing and a turbine rotor rotatably supported in said turbine casing, said exhaust system of the engine having exhaust pipe means defining an exhaust passage and connected with said turbine casing, said turbine casing having exhaust gas inlet passage means for directing exhaust gas of the engine from the exhaust passage to said turbine rotor, said inlet passage means including at least a first inlet passage and a second inlet passage which are located in a side-by-side relationship with each other, valve means for closing said second inlet passage, characterized by the fact that said first and second inlet passages are opened to said exhaust passage in said exhaust pipe means respectively through first and second inlet ports which are oriented in a direction opposing exhaust gas flow in the exhaust passage, said exhaust pipe means being formed in a portion adjacent to said turbine casing with a sidewardly bulged portion, said valve means including a valve member adapted for seating on a valve seat formed in a peripheral portion of the second inlet port for closing said second inlet port and swingable arm means for supporting said valve member swingably on said exhaust pipe means so that said valve member can be moved from a closed position seating on said valve seat against the exhaust gas flow to an open position in which said valve member is located substantially in said bulged portion.

2. A turbo-supercharged in accordance with claim 1 in which said exhaust pipe means is of a cross-sectional configuration which covers both said first and second inlet ports.

3. A turbo-supercharged in accordance with claim 1 in which each of said first and second inlet ports is of an oblong configuration having a minor axis and a major axis, said first and second inlet ports being aligned in the direction of the minor axis.

4. A turbo-supercharger in accordance with claim 3 in which said swingable arm means of the valve means has a swinging axis which is substantially parallel with the major axes of the to oblong configuration of the inlet ports.

5. A turbo-supercharger in accordance with claim 1 in which said turbine casing has an inlet end surface which is mated with an outlet end surface of the exhaust pipe means, said first and second inlet ports being opened at said inlet end surface, said valve member of said valve means being adapted to be seated on a valve seat defined on said inlet end surface around said second inlet port.

6. A turbo-supercharger in accordance with claim 5 in which said swingable arm means of said valve means has a swinging axis located in said bulged portion of the exhaust pipe means.

7. A turbo-supercharger in accordance with claim 1 which further includes valve actuator means for actuating said valve means between the open and closed positions, said actuator means being mounted on said exhaust pipe means.

8. A turbo-supercharger in accordance with claim 1 in which said valve member is connected with said swingable arm means through a floating connection which allows a relative movement between the valve member and the swingable arm means.

9. A turbo-supercharger in accordance with claim 8 in which said valve member is connected with said swingable arm means by means of a pair of pins.

10. A turbo-supercharger in accordance with claim 9 in which said pins have different lengths.

11. A turbo-supercharger in accordance with claim 8 in which said valve member is formed with at least one through-hole, said swingable arm means having means for closing said through hole in the closed position and opening said through hole when the swingable arm means is moved in the direction of opening the valve means.

12. A turbo-supercharger in accordance with claim 5 in which said valve member of said valve means substantially covers an end surface of a partition wall between said inlet and outlet ports.

* * * * *